Patented June 28, 1927.

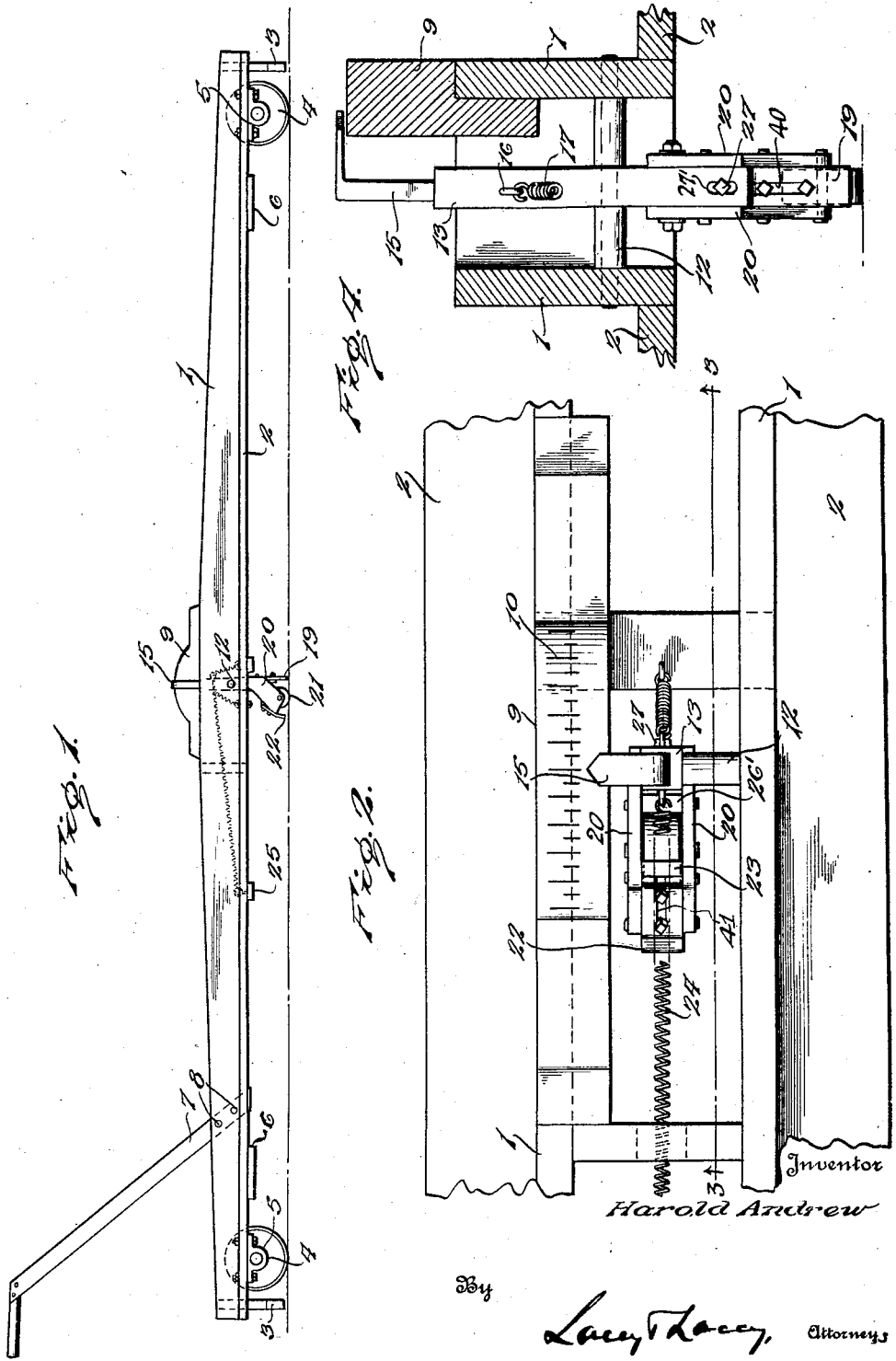

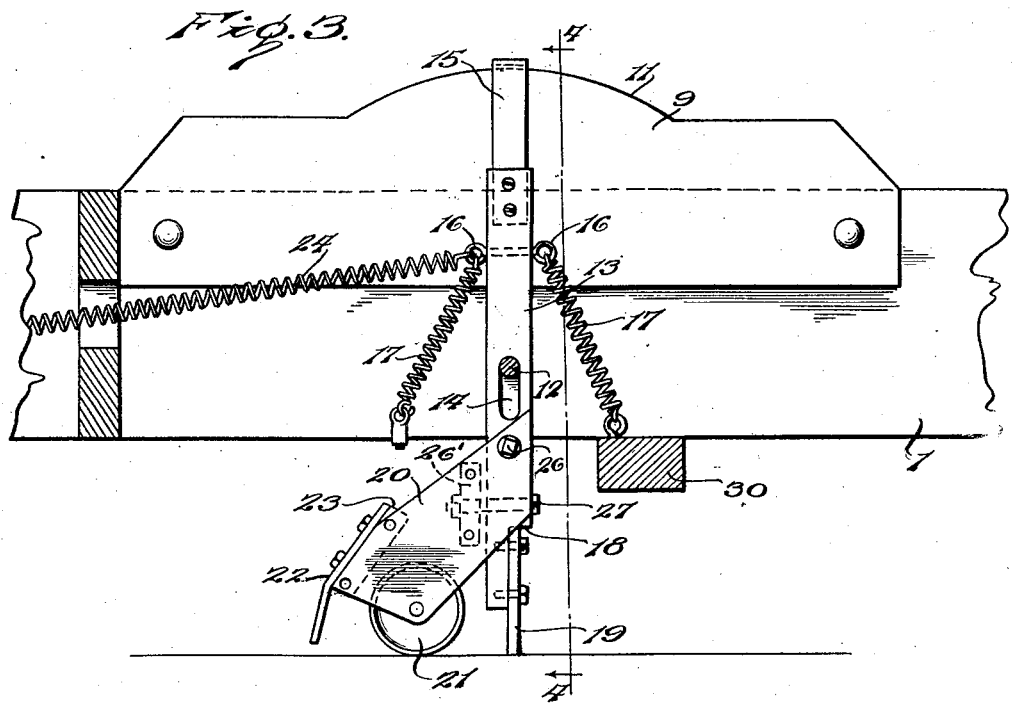
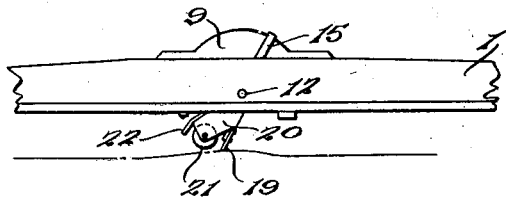
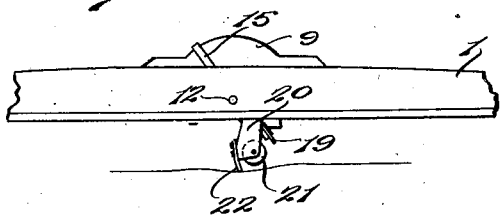

1,633,841

UNITED STATES PATENT OFFICE.

HAROLD ANDREW, OF PRINCETON, ILLINOIS.

DEVICE FOR DETECTING AND MEASURING THE UNEVENNESS OF A SURFACE.

Application filed September 4, 1924. Serial No. 735,968.

This invention is a device for detecting and measuring the unevenness of a surface, such as a newly laid pavement, and has for its object the provision of a simple, compact and easily operated device whereby depressions or elevations in the surface may be readily detected so that the pavement may be efficiently treated to remove such depressions or elevations and bring the entire surface into a smooth level condition. Another object of the invention is to provide a simple and compact device which may be easily and adjusted to a predetermined arbitrary minimum deviation, and will accurately measure variations greater than such minimum deviation, while another object of the invention is to provide means whereby the indicating elements will be normally held in the position indicating a level surface and will be readily returned to that position after having indicated a variation in the surface. Another object of the invention is to provide a device which accurately measures the height of the elevation above or the depth of the depression below the mean surface. Other objects of the invention will appear incidentally in the course of the following description, and the invention resides in certain novel features which will be particularly pointed out in the appended claims.

In the drawings:

Figure 1 is a side elevation of the complete device showing the same arranged upon a surface which is to be tested;

Fig. 2 is an enlarged plan view of the central portion of the device;

Fig. 3 is a longitudinal section on the line 3—3 of Fig. 2 the lowest horizontal line in this figure indicating the minimum height of deviation;

Fig. 4 is a transverse section on the line 4—4 of Fig. 3;

Figs. 5 and 6 are details illustrating the operation of the device.

In carrying out the invention, I employ two side bars or beams 1 which are arranged parallel and may be of any desired extent. As shown most clearly in Fig. 4, these side bars or beams are constructed to provide laterally extending flanges or bases 2 furnishing ample means to secure cross bars or other connecting devices thereto. At the ends of the side bars or beams 1, I provide the cross heads 3 which are secured rigidly to the side bars and depend below the same, as shown in Fig. 1, to points near the surface to be tested. These heads serve as fenders to push aside possible obstructions, such as stones or gravel which may find lodgment upon the pavement, so that they will not interfere with the movement of the device nor exercise any deflecting influence upon the wheels 4 which are provided at the ends of the device to support the same. These wheels 4 have their axles mounted in bearings 5 which are secured to the under sides of the beams 1 and the flanges 2 thereof and they are, of course, duplicates in form and mounting so that the lowest points of their peripheries will be at the same distance below the beams to thereby support the beams in parallelism with the surface which is being tested. The beams are connected near their ends by cross bars or braces 6 and near one end a handle member 7 of any convenient form is secured thereto. This handle member, as shown in Fig. 1, is secured by a pair of bolts 8 so that it will be rigid with the side bars when in use but by removing the upper bolt the handle may be folded over onto the beams and thereby permit the storing of the device within a small space.

Midway the ends of one of the beams 1, I rigidly secure thereto a dial block 9 which projects above the top edge of the beam and has an arcuate portion 11 on its own top edge inscribed with graduations as indicated at 10. See Figs. 2, 3 and 4. Extending transversely between and secured in the beams concentric with the arcuate edge 11 of the dial block is a pintle 12 upon which is mounted an indicator shank 13, the said shank being provided with a longitudinal slot 14 through which the pintle extends, as shown most clearly in Fig. 3. An index finger or pointer 15 rises from the shank and has its upper extremity turned laterally, as shown most clearly in Fig. 4, to project over the arcuate edge of the dial block. The drawings, particularly Fig. 3, show this finger as having its lower end resting in a socket formed in the upper end of the shank and secured by set screws mounted in a side of the shank to bind against a side of the finger in an obvious manner. At an intermediate point of the height of the indicator shank or bar 13 are provided eyes 16 disposed on the front and rear sides of the bar, and springs 17 are engaged at their upper ends in the said eyes and have their lower ends secured in any convenient manner to fixed elements at or in the plane of the lower edges of the side bars. These springs 17 exert counterbalancing pulls upon the front and rear of the shank 13 tending to hold it in a perpendicular position resting on the pintle 12 but if the device should be accidentally dropped and the parts carried by the shank come into forcible contact with a hard object, the springs will yield and the slot 14 will permit the shank to move upwardly so that the blow will be cushioned and breakage of parts or loss of adjustment be rendered unlikely. The lower end of the shank or bar 13 is reduced or recessed, as shown at 18, and a transverse indicator or surface contact element, shown as a scraper blade 19, is secured to the front face of the reduced extremity of the shank, as shown clearly in Fig. 3. To the opposite sides of the indicator shank 13, I secure the cheek plates 20 which extend downwardly and rearwardly therefrom and carry between their lower edge portions a gage roller 21 which is adaptto run upon the surface which is being tested. At the rear corners of the cheek plates 20, I provide a transverse indicator or surface contact element 22 which is similar to the gage plate 19, a bracing block 23 being disposed between and bolted or otherwise rigidly secured to the cheek plates and the gage plate 22 being secured to said block. Slots 40, 41 are formed in the plates 19 and 22 respectively and the securing bolts are inserted through said slots into the lower end of the shank and into the block 23 respectively, thereby providing for adjustment of the plates in a well-known manner. Immediately in rear of the shank, a block 26' is secured to and between the cheek plates and an adjusting bolt 27 is inserted through said block and a vertical slot 27' in the lower end of the shank. The cheek plates are held to the shank 13 by a bolt 26 passed through their upper corners and through the indicator shank. When this bolt is tightened, the cheek plates will be held rigid but if the bolt be loosened the cheek plates may be moved pivotally about the same as a center to permit shims or washers to be placed on the bolt 27 between the block 26' and the shank. When the proper position of the wheel 21 relative to the shank has been thus attained, the bolts 26 and 27 are tightened to hold the parts in the set relation. The block 26' does not interfere with this adjustment as ordinarily the movement is too slight to bring the block against the indicator shank.

A coiled spring 24 is attached at its front end to the rear eye 16 and has its rear end secured to a cross bar 25 or to an eye thereon which is fixed relative to the side beams. This spring 24 tends to swing the upper portion of the indicator bar or shank rearwardly and the lower portion thereof forwardly against the stop block 30 which is secured to the lower edges of the side bars 1. Without the spring 24, it would be practically impossible to measure depressions in the surface although elevations could be measured. When the device is not in use, the spring 24 swings the lower end of the indicator shank forwardly against the stop block 30, but, as the device is set upon the surface to be tested, the rear gage plate and then the gage roller 21, coming in contact with the surface, cause the shank to assume a vertical or nearly vertical position if the surface be level.

For use the device is adjusted as follows: The indicator shank or bar 13 is placed in a position at a right angle to a straight line touching the lowest points of the peripheries of the supporting wheels 4. The front gage or surface contact element 19 is then adjusted to the minimum height of surface deviation which it is desired to detect, by setting its lower end at this minimum height above the straight line touching the bottoms of the peripheries of the wheels 4. The cheek plates 20 are swung about the securing bolt 26 until the bottom of the periphery of the gage roller 21 is at the same minimum height above the aforesaid straight line touching the peripheries of the supporting wheels 4. The rear gage or surface contact element 22 is then adjusted by rotating the lower part of the shank 13 forwardly until the bottom of the roller 21 is below the straight line touching the peripheries of the wheels 4 a distance equal to the selected height of minimum deviation, and then setting the rear scraper blade so that its lower edge is that same distance below the straight line touching the peripheries of the supporting wheels. In use, the device is pushed forward over the surface to be tested and as long as that surface is smooth the rollers 4 and 21 will rest thereon in a single plane and the indicator will remain at rest. Should there be an elevation on the surface which is of greater height than the minimum height of deviation for which the scraper gages have been set, the front gage 19 will ride onto that elevation and will rock the indicator so that its upper portion will swing forwardly, as indicated in Fig. 5, and the extent of the oscillation will, of course, be readable upon comparison of the index finger or pointer 15 with the graduations 10. When the elevation has been passed, the springs 17 and 24 will at once return the indicator to its vertical or nearly vertical position supported upon the pintle 12. Should a depression be encountered, the front gage will, of course, pass over the depression but the roller 21 will drop into the same and the rear gage 22 will likewise drop and ride upon the bottom of the depression, as shown in Fig. 6, the indicator then swinging rearwardly to indicate the depth of the depression by a reading of the graduations 10. In addition to the cooperation of the pointer with the graduations 10 as an indication of the presence of an elevation or a depression, the scrapers or gage plates will produce a scraping or grinding sound by their contact with the pavement and, furthermore, the progress of the tool will be retarded by such engagement so that users of the device will be notified by three different agencies of the presence of the elevation or the depression and may readily note and mark the location and extent of the same to facilitate the work of reducing the same. The graduations 10 measure the vertical distance (height or depth) of the surface deviation from the straight line touching the bottoms of the rollers 4. The graduations are preferably in inches but may be in metrical notations.

It will be understood, of course, that the device is run over a predetermined length of the pavement or other surface along one line and then run over the same length of pavement in as many parallel lines as may be deemed advisable. The device is simple and compact and will operate automatically and efficiently to indicate the existence of a depression or elevation in excess of the permitted variation from a true level.

Having thus described the invention, I claim:

1. A device for the purpose set forth comprising a frame, traveling supports for the frame, an oscillatory indicator mounted upon the frame between the supports, and a plurality of gage elements carried by the indicator and spaced apart in the direction of travel of the frame to be separately actuated by variations in the surface over which the frame travels and respectively locate depressions and elevations therein.

2. A device for the purpose set forth comprising a frame, traveling supports for the frame at the ends thereof, a dial carried by the frame between the ends thereof, an indicator shank mounted for oscillation upon the frame and having its upper end cooperating with the dial, a supporting roller carried by the lower end of the indicator shank, and gage elements carried by the lower end of the indicator shank at the front and the rear of the supporting roller in the direction of travel of the frame.

3. A device for the purpose set forth comprising a frame, traveling supports for the frame, an oscillatory indicator mounted upon the frame between the supports therefor, a yieldable connection between the indicator and the frame, and gage elements carried by the lower end of the indicator and spaced apart in the direction of travel of the frame and adapted to bear upon the surface over which the frame travels whereby to rock the indicator forwardly or rearwardly respectively.

4. A device for the purpose set forth comprising a frame, traveling supports for the frame at the ends thereof, an indicator mounted for oscillation upon the frame between the ends thereof, gage elements carried by the lower end of the indicator and spaced apart in the direction of travel of the frame, and a yieldable connection between the frame and the indicator holding the indicator with its lower end swung forward in the direction of travel of the frame.

5. A device for the purpose set forth comprising a frame, traveling supports for the frame at the ends thereof, an indicator mounted for oscillation upon the frame between the ends thereof, gage elements carried by the lower end of the indicator and spaced apart in the direction of travel of the frame, tension springs attached to the frame and to opposite sides of the indicator whereby to yieldably hold the indicator lowered, and a spring attached to the indicator and to the frame to hold the indicator with its lower end swung forward in the direction of travel of the frame.

In testimony whereof I affix my signature.

HAROLD ANDREW. [L. S.]